United States Patent [19]

Delhees et al.

[11] 4,240,184
[45] Dec. 23, 1980

[54] PIPE AND CABLE CLAMPS

[75] Inventors: Peter Delhees, Liverpool; John P. Conlan, Chester, both of England

[73] Assignee: BICC Limited, London, England

[21] Appl. No.: 957,027

[22] Filed: Nov. 2, 1978

[51] Int. Cl.³ .................. B65D 63/00; F16L 33/04; F16L 47/00
[52] U.S. Cl. .................. 24/279; 248/231; 285/253; 403/397
[58] Field of Search ............ 24/279, 280; 248/74 PB, 248/231; 285/197, 253, 420; 403/397

[56] References Cited

U.S. PATENT DOCUMENTS

| 421,104 | 2/1890 | Mitchell | 24/279 |
|---|---|---|---|
| 732,309 | 6/1903 | Marshall | 24/279 |
| 982,028 | 1/1911 | Austin | 285/197 |
| 1,383,058 | 6/1921 | Atkin | 24/281 |
| 1,473,715 | 11/1923 | Wessel | 24/279 |
| 1,853,473 | 4/1932 | Terwilliger et al. | 285/253 |
| 2,004,182 | 6/1935 | Arey | 248/231 |
| 3,261,577 | 7/1966 | De Gryse et al. | 24/279 |

FOREIGN PATENT DOCUMENTS

| 485886 | 12/1975 | Australia | 285/197 |
|---|---|---|---|
| 1073851 | 9/1954 | France | 24/279 |
| 1169760 | 1/1959 | France | 24/279 |
| 759179 | 10/1956 | United Kingdom | 24/281 |
| 835605 | 5/1960 | United Kingdom | 24/279 |

Primary Examiner—Victor N. Sakran
Attorney, Agent, or Firm—Buell, Blenko, Ziesenheim & Beck

[57] ABSTRACT

A clamp includes a flexible member that can be wrapped round a cable and secured by means of end-fittings, integral with the flexible member or permanently attached to it. A pair of faying surfaces (one on each end-fitting) engage one another when the clamp is wrapped round a cable with any circumference in a working range in relative positions that vary (by displacement in the plane normal to the cable axis) with the circumference within that range.

6 Claims, 7 Drawing Figures

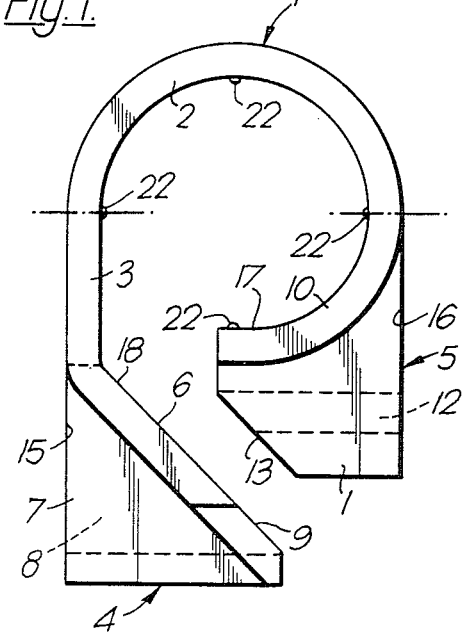
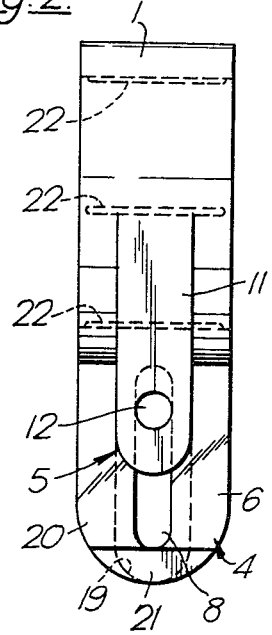
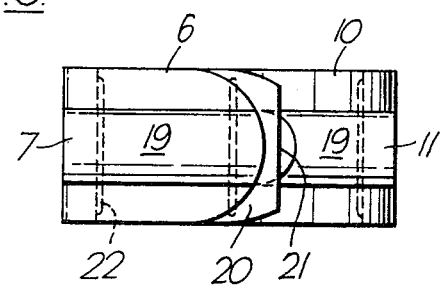

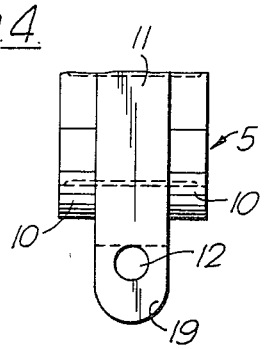
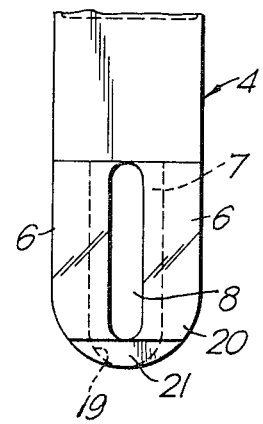
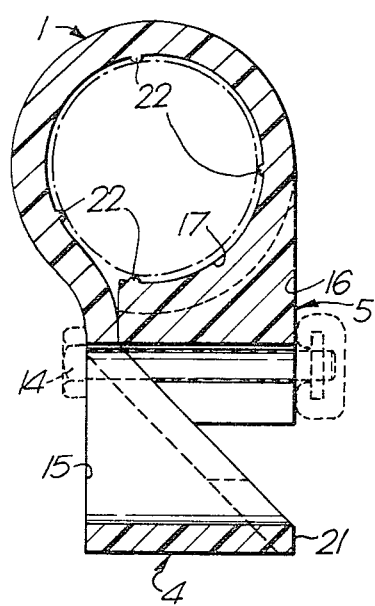
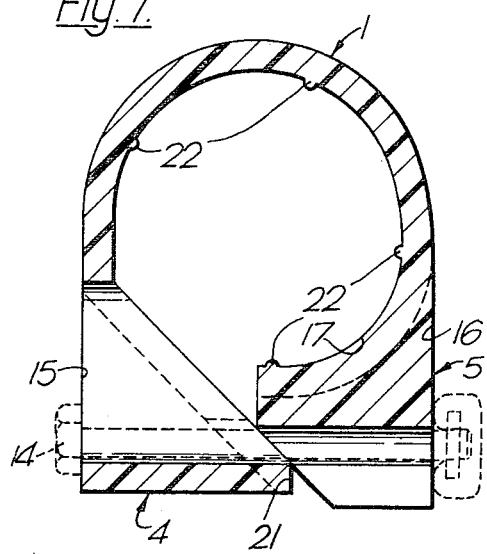

PIPE AND CABLE CLAMPS

This invention relates to clamps for securing pipes, cables and the like, and since the type of article to be gripped will not normally influence the structure of the clamp only cables will be expressly referred to hereinafter. More particularly it relates to clamps of the kind including a flexible member that can be wrapped round a cable and secured by means of end-fittings integral with the flexible member or permanently attached to it and used with a screw which both tightens the clamp round the cable and secures it on a suitable support. One such clamp is sold by the Applicant company (through its subsidiary BICC Components Ltd.) under the Trade Mark "Telcleat".

In accordance with the invention the end-fittings are shaped to provide a pair of faying surfaces (one on each end-fitting) which engage one another when the clamp is wrapped around a cable with a circumference in a certain range in relative positions that differ by displacement in the plane normal to the cable axis dependent on the magnitude of the circumference within that range. Cables with a circumference somewhat larger than the range referred to can be accommodated by allowing the formation of a gap between the faying surfaces, as in the known clamps in which the end-fittings touch in one fixed relative position only.

Preferably the faying surfaces are planar, and when the clamp is wrapped round a circular cable (with a circumference within the range of the clamp) they will always be non-radial with respect to the cable to a substantial degree. Preferably they approximate to a plane tangential to such a circular cable. The angle between the faying surfaces and the local radius will vary over the area of the surfaces, but is preferably in the region of 45°.

The apertures for the fixing screw will usually pass through the faying surfaces, and to allow for the variation in relative position of the faying surfaces it will normally be necessary for at least one of the apertures to be wider, in the direction of the length of the flexible member, than the diameter of the screw to be used. Exceptionally in some of the cases in which only discrete cable sizes are to be accommodated a row of separate holes could be used.

Preferably the end-fitting that has the screw-hole that is elongate or otherwise wider than the screw is the one on which the faying surface inclines towards the other end-fitting in a direction away from the cable; the other end-fitting preferably has a round hole to position the screw accurately.

In most cases the end-fittings will also provide abutment surfaces for engagement with a support surface and the screw head; these are preferably planar and preferably parallel to one another when the faying surfaces are in contact with one another.

Each of the end-fittings may also provide a support surface for engagement with the cable; when the faying surfaces are substantially tangential to the cable, one of these may be a continuation of one of the faying surfaces.

The faying surfaces, the abutment surfaces and the support surfaces may each be a real surface (that is a surface bounding the solid material of the end-fittings) but in some cases they may alternatively be virtual surfaces defined by one or more upstanding ribs and/or edges and/or one or more local projections.

Usually the clamp will be moulded in one piece from flexible but resilient material, for example polythene, and in this respect a number of possibilities arise. It may for example be moulded with the flexible strap in a planar configuration, which considerably simplifies the moulding process, especially if ribs or other gripping formations are to be provided on the strap. Alternatively, it may be moulded with at least part of the strap in an arcuate form, approximately the form it will have when the clamp is in use, thereby simplifying installation. In some cases it may be possible to achieve a beneficial compromise between these two approaches by initially moulding in a planar configuration and subsequently bending to arcuate form and stabilising in that form by heat-treating the strap at a temperature high enough to release stresses but not high enough to risk loss of shape.

The invention will be further described, by way of example, with reference to the drawings in which:

FIGS. 1–3 are mutually perpendicular views of one form of clamp in accordance with the invention shown in its "as-moulded" condition;

FIGS. 4–5 are views, corresponding to FIG. 2, showing the two end fittings separately; and FIGS. 6–7 are views, corresponding to FIG. 1, illustrating how the clamp accommodates different cable sizes.

The clamp comprises a strap 1 made up of a semicircular part 2 and a flat part 3 which merge with one another, and both of which are flexible enough to be deformed by hand, and two end-fittings 4 and 5 which are relatively rigid.

The end-fitting 4 comprises an extension 6 of the straps inclined at an acute angle (say 45°) to the flat part 3 and merging into it and a generally triangular stiffening flange 7, with an elongate hole 8 passing through both of them, the clear face of the extension 6 providing a faying surface 9.

Somewhat similarly the other end-fitting 5 comprises a curved extension 10 of the strap which is distinguished from the semicircular part 2 only by a stiffening flange 11, but in this case the hole 12 is round and lies wholly within the flange, and the faying surface 13 is formed on the flange. This faying surface is parallel to the first faying surface 9 or approximately so when the clamp is undeformed.

In use the clamp is sprung round the cable to be clamped and secured by a screw or other fastener 14 (FIGS. 6 & 7) inserted through the elongate hole 8 and passing through the round hole 12 to an appropriate support. Depending on the size of the cable, the faying surfaces 9 and 13 may come together in any of the range of positions bounded by those shown in FIGS. 6 and 7; or if the cable is a little too large for this to happen, the clamp may tighten satisfactorily without the surfaces 9 and 13 touching one another.

This clamp has abutment surfaces 15, 16 and a support surface 17; the proximal part 18 of the abutment surface 9 acts as an additional support surface when the cable gripped is large.

In the particular design shown, the surfaces 19 of the flanges 7 and 11 that are parallel to the screw axis are rounded, for the sake of saving material, and the free end 20 of the strap extension 6 is also rounded, except that its extremity is truncated to provide a flat surface 21 perpendicular to the screw axis. Also ribs 22 are provided to enhance grip on some cables. These are however not to be considered substantial features of the clamp described.

The clamp shown in the drawings, in a typical size, accommodates cables with a circumference in the range 123–160 mm, a range-taking capacity of approximately 37 mm on the cable circumference, compared with around 10–12 mm for a conventional clamp of the most nearly equivalent size, so considerably reducing stock-holding requirements.

What we claim as our invention is:

1. A support clamp including a flexible member and end-fittings, integral with the flexible member or permanently attached to it, such that when the clamp is wrapped round a cable it can be secured and supported by means of said end-fittings, each said end-fitting having a faying surface which faying surfaces (i) engage one another when the clamp is wrapped round a cable with a circumference in a predetermined range in relative positions that differ by displacement in the plane normal to the cable axis dependent on the magnitude of the circumference within that range and (ii) extends substantially from end to end of each said end-fitting in the direction of said displacement.

2. A support clamp including a flexible member and fittings, integral with the flexible member or permanently attached to it, such that when the clamp is wrapped round a cable it can be secured and supported by means of said end-fittings, each said end-fitting having a planar faying surface which faying surfaces (i) are non-radial to the cable to a substantial degree when the clamp is wrapped round a circular cable with a circumference in a predetermined range; (ii) engage one another in relative positions that differ by displacement in the plane normal to the cable axis dependent on the magnitude of the circumference within that range; and (iii) extends substantially from end to end of each said end-fitting in the direction of said displacement.

3. A clamp as claimed in claim 2 in which when the clamp is wrapped round a circular cable with a circumference in the said range the faying surfaces approximate to a plane tangential to such a circular cable.

4. A clamp as claimed in claim 3 in which the angle between the faying surfaces and a local radius is in the region of 45°.

5. A clamp as claimed in claim 1 or claim 2 or claim 3 in which apertures for a fixing screw pass through the faying surfaces and one of said apertures is elongate in the direction of the length of the flexible member.

6. A clamp as claimed in claim 1 or claim 2 or claim 3 in which each said end-fittings also provides a support surface for engagement with the cable.

* * * * *

REEXAMINATION CERTIFICATE (34th)

United States Patent [19]
Delhees et al.

[11] B1 4,240,184
[45] Certificate Issued  Nov. 23, 1982

[54] PIPE AND CABLE CLAMPS

[75] Inventors: Peter Delhees, Liverpool; John P. Conlan, Chester, both of England

[73] Assignee: BICC Limited, London, England

Reexamination Request
No. 90/000,134, Dec. 23, 1981

Reexamination Certificate for:
Patent No.: 4,240,184
Issued: Dec. 23, 1980
Appl. No.: 957,027
Filed: Nov. 2, 1978

[51] Int. Cl.³ .......... B65D 63/00; F16L 33/04; F16L 47/00
[52] U.S. Cl. ........ 24/279; 248/231; 285/253; 403/397
[58] Field of Search .............. 24/279, 280; 248/74 PB, 248/231; 285/197, 253, 420; 403/397

[56] References Cited

U.S. PATENT DOCUMENTS

| | | | |
|---|---|---|---|
| 421,104 | 2/1890 | Michell | 24/279 |
| 732,309 | 6/1903 | Marshall | 24/279 |
| 982,028 | 1/1911 | Austin | 285/197 |
| 1,383,058 | 6/1921 | Atkin | 24/281 |
| 1,473,715 | 11/1923 | Wessel | 24/279 |
| 1,853,473 | 4/1932 | Terwilliger et al. | 285/253 |
| 2,004,182 | 6/1935 | Arey | 248/231 |
| 3,261,577 | 7/1966 | De Gryse et al. | 24/279 |
| 4,153,228 | 5/1979 | Delserro | 248/74 |

FOREIGN PATENT DOCUMENTS

| | | | |
|---|---|---|---|
| 485886 | 12/1975 | Australia | 285/197 |
| 1073851 | 9/1954 | France | 24/279 |
| 1169760 | 1/1959 | France | 24/279 |
| 548846 | 10/1942 | United Kingdom. | |
| 759179 | 10/1956 | United Kingdom | 24/281 |
| 835605 | 5/1960 | United Kingdom | 24/279 |

*Primary Examiner*—Victor N. Sakran
*Attorney, Agent, or Firm*—Eugene F. Buell

[57] ABSTRACT

A clamp includes a flexible member that can be wrapped round a cable and secured by means of end-fittings, integral with the flexible member or permanently attached to it. A pair of faying surfaces (one on each end-fitting) engage one another when the clamp is wrapped round a cable with any circumference in a working range in relative positions that vary (by displacement in the plane normal to the cable axis) with the circumference within that range.

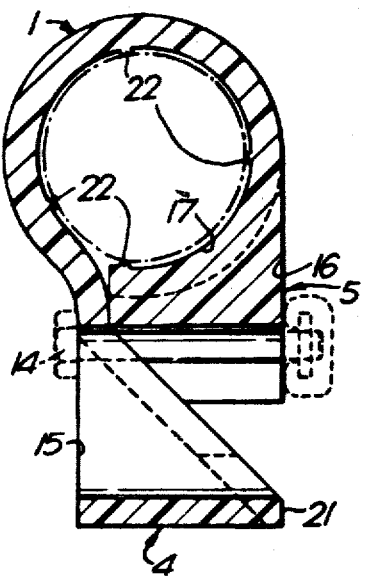

REEXAMINATION CERTIFICATE ISSUED UNDER 35 U.S.C. 307.

THE PATENT IS HEREBY AMENDED AS INDICATED BELOW.

Matter enclosed in heavy brackets appeared in the patent, but has been deleted and is no longer a part of the patent; matter printed in italics indicates additions made to the patent.

AS A RESULT OF REEXAMINATION, IT HAS BEEN DETERMINED THAT:

Claims 1, 2 and 5 are determined to be patentable as amended.

1. A support clamp including a flexible member and *at the ends thereof* end-fittings, integral with the flexible member or permanently attached to it, such that when the clamp is wrapped round a cable it can be secured and supported by means of said end-fittings *with both substantially the whole length of said flexible member and also one said end-fitting in direct contact with said cable*, each said end-fitting having a faying surface which faying surfaces (i) engage one another when the clamp is wrapped round a cable with a circumference in a predetermined range in relative positions that differ by displacement in the plane normal to the cable axis dependent on the magnitude of the circumference within that range, [and] (ii) *extend* [extends] substantially from end to end of each said end-fitting in the direction of said displacement *(iii) have apertures for receiving a fixing screw that extends through said faying surfaces and (iv) are inclined to said screw in the direction such that pressure from the screw tends to displace the end-fittings in the tightening direction.*

2. A support clamp including a flexible member and *at the ends thereof* fittings, integral with the flexible member or permanently attached to it, such that when the clamp is wrapped round a cable it can be secured and supported by means of said end-fittings *with both substantially the whole length of said flexible member and also one said end-fitting in direct contact with said cable*, each said end-fitting having a planar faying surface which faying surfaces (i) are non-radial to the cable to a substantial degree when the clamp is wrapped round a circular cable with a circumference in a predetermined range; (ii) engage one another in relative positions that differ by displacement in the plane normal to the cable axis dependent on the magnitude of the circumference within that range; [and] (iii) *extend* [extends] substantially from end to end of each said end-fitting in the direction of said displacement; *(iv) have apertures for receiving a fixing screw that extends through said faying surfaces and (v) are inclined to said screw in the direction such that pressure from the screw tends to displace the end-fittings in the tightening direction.*

5. A clamp as claimed in claim 1 or claim 2 or claim 3 in which [appertures for a fixing screw pass through the faying surfaces and] one of said apertures is elongate in the direction of the length of the flexible member.

Claims 3, 4 and 6, dependent on amended claims, are determined to be patentable.

* * * *